April 28, 1970          H. H. GREGER          3,509,057
METHOD FOR THERMAL SYNTHESIS OF POLYOXIDE COMPOUNDS
Filed March 10, 1964          2 Sheets-Sheet 2

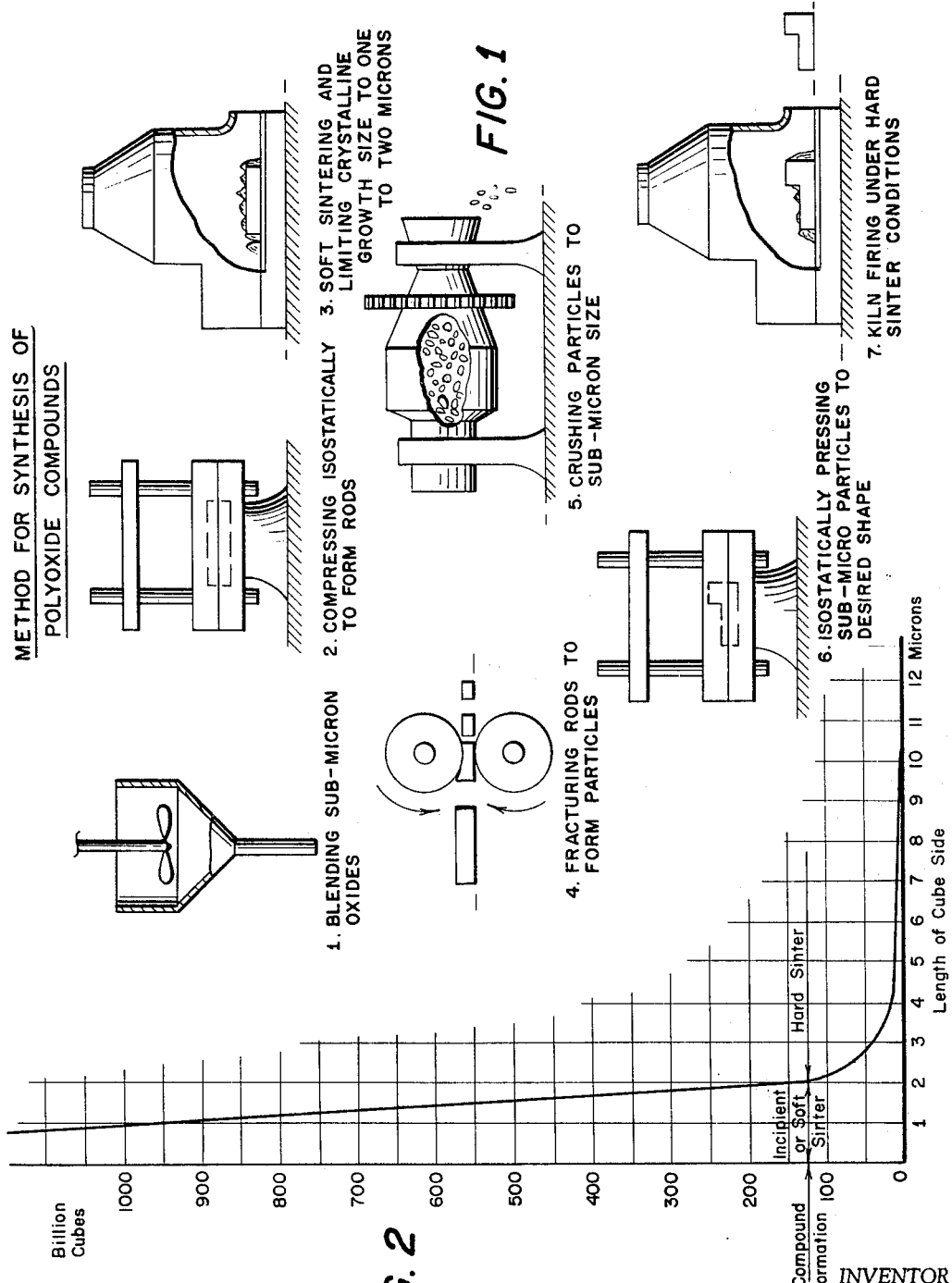

Inventor

HERBERT H. GREGER

By Semmes and Semmes

Attorneys

United States Patent Office 3,509,057
Patented Apr. 28, 1970

3,509,057
METHOD FOR THERMAL SYNTHESIS OF POLYOXIDE COMPOUNDS
Herbert Hans Greger, 9901 Glen Road, Rockville, Md. 20854
Filed Mar. 10, 1964, Ser. No. 350,803
Int. Cl. C01g 1/00; C04b 35/24
U.S. Cl. 252—62.56         9 Claims

ABSTRACT OF THE DISCLOSURE

A process for producing polyoxide compounds of improved magnetic properties is disclosed. The raw materials are reduced to powders of an average particle size of less than 1 micron and blended to form an homogeneous mixture. The mixture is compressed to form a shaped article. The shaped article is soft-sintered at a temperature which limits the average crystalline growth size of the polyoxide compounds to no greater than 2 microns. The soft-sintered shaped article is thereafter reduced in size to a powder of an average particle size of no greater than 2 microns and thereafter formed into another shaped article. This latter shaped article is hard-sintered to produce a final polyoxide compound shaped article, which can be used in the solid state microwave electronic field.

---

Figure 3A:
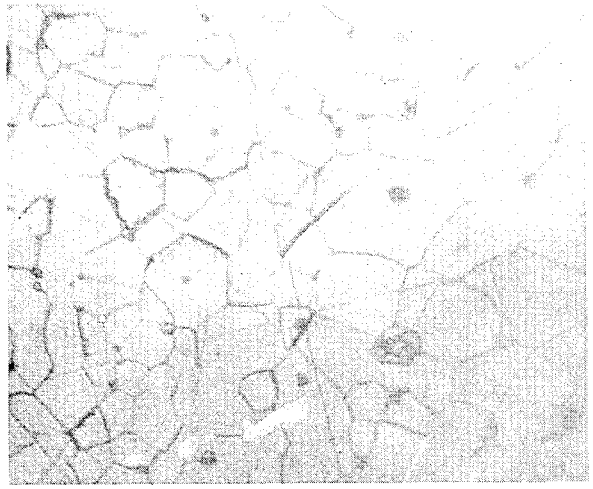

This invention is related to improvements in the production of polyoxide compounds by thermo-chemical and ceramic methods at high temperatures. More specifically it is related to the production phase that is generally referred to as "presintering." This phase has usually the function of compound formation and densification of the raw materials to reduce shrinkage in the final shape during kiln firing. It serves these purposes in many instances sufficiently well, but is woefully inadequate in terms of reproducible accuracies required by the electronic industry. The purpose of this invention is directed towards means and methods to minimize or to eliminate these inadequacies.

Much of the variation in saturation magnetization, resonance linewidth, dielectric loss, permeability, etc., can be traced to inadequacies in conventional pre-sintering. This is a complex process of compound formation, materials diffusion and crystal growth which is affected in various degree by temperature, homogeneity, particle size and shape, contact area, proximity of the reactants, inherent reactivity, impurities and fluxes, vapor pressure, composition of atmosphere, time, etc. This large number of variables can impose many defects on compound formation, and it is evident that some of the variables must be standardized and effects of others strengthened or suppressed as may be required to secure reliable production methods.

The degree of improvement required by the industry can be judged from published reproducibility ranges in available sales literature of ±20 percent; ±10 percent is rarely shown, but the desired range for electronic materials is ±2½ percent or better. Most of the electronic test equipment is built for accuracies of ±1 percent or better and the manufacturer of electronic ceramics is asked to meet these accuracies, with suitable materials.

Compounds of oxides in the form of essentially dense polycrystalline materials are finding increasingly important uses in the electronic and other industries as dielectric materials, in the form of silicates, titanates, aluminates, zirconates, etc.; as magnetic materials, for instance, in the form of soft ferrites of the spinel and garnet type or hard ferrite; or as piezoelectric materials; or refractory and insulating materials, etc.

In the manufacture of such materials three general steps are observed: (1) Material preparation by mixing oxide powders and subsequently reacting them by heating to form the desired compound; (2) Forming of shapes from compound powder; (3) Final kiln firing at high temperature to sinter the formed shapes to full density and strength. All three steps are interrelated as each preceding step affects the following step and must be so guided that tht final result is a reproducible material of well defined characteristics.

The materials preparation methods of today, in step (1), as generally practiced by "presintering," do not usually produce a chemically homogeneous material of controlled particle size. As a consequence, the third step, or kiln firing, is burdened with all defects from step (1) and these can vary greatly. They may not, or often only in part, become rectified during kiln firing, thus giving rise to fluctuations in properties.

It is therefore essential, and it is the purpose of this invention to improve step (1), and in this manner develop methods for the production of improved electronic-ceramic materials, and to burden step (1) fully with the task of providing a powder of chemically homogeneous polyoxide compounds of ultimate crystal size averaging about 1 micron or less, which then becomes the raw material for steps (2) and (3).

In order to achieve these objectives in step (1), it is necessary to start with constituent oxide materials of at least ½ micron and preferably, of about 0.1 micron ultimate crystal size, mixing the constituent materials to achieve a homogeneous distribution of particles, then providing a maximum proximity of the particles to each other, and subsequently reacting the mixture thermochemically under controlled conditions of temperature and time.

Thermally induced reactions in solid particles are usually accompanied by crystal growth. Such crystal growth takes place in steps (1) and (3), but in step (1) this growth is limited in accordance with this invention to an average of about 1 micron, to be continued later in step (3) to an average of about 8 microns at higher temperature. For the purpose of this invention it is necessary that compound formation is essentially complete during step (1) and that this is accomplished without exceeding substantially a crystal growth beyond an average of 1 micron. The method of accomplishing essentially complete compound formation or thermochemical synthesis in step (1) under the limitation of an average crystal growth to about 1 micron, is the purpose of this invention. When this is achieved in step (1) and all production steps (1), (2) and (3) are completed, a final product is obtained that is dense and mechanically strong; complies with narrow tolerance specifications; has satisfactory reproducibility; has a structure of very uniform crystalline grain size and no visible pores or second phase. This is shown in micrographs of FIGURE 3.

Conventionally, a ball mill, a high speed blender or other similar equipment are used for intimate mixing of the constituent powders by dispersing them in water or other liquid medium. The liquid is then removed and the dried mixture of powders is reacted by heating in a suitable kiln. The product of conventional "presintering" is usually an uncontrolled mixture of fully reacted, partially reacted and unreacted material consisting of large and small crystals, agglomerated lumps and fines. This product is then ground, for instance, in a ball mill to 1 to 3 microns, dried, and finished by forming and kiln firing. In some examples, given later, the inadequacies of the resulting product will be further explained.

In this invention it has been observed that large particles, composed of agglomerated crystals, will crush rather readily in a ball or jet mill and can be pulverized to free the ultimate crystals. So long as the ultimate crystals can be kept in the 1 micron range, it is feasible to obtain a powder in this particle size range by simple methods of grinding. If, however, the individual crystals are larger, or are aggregated into hard sintered lumps, grinding may prove very difficult by any means and contamination from mill abrasion can become serious. Large individual crystals are often very tough and will escape crushing with the result that the ground materials contain an appreciable quantity of large particles. These and impurities from mill abrasion are undesirable as they interfere with the uniformity of crystal size and the chemical stoichiometry in the end product. Large crystals or hard lumps are formed by overheating and good temperature control is important during material preparation.

Experience has shown that the reaction temperatures may be dropped by 100 to 150 °C. to achieve the same degree of reaction as in the conventional method if the proximity of the reacting particles is increased by forcing them together under high pressure, such as in an isostatic press at 5000 to 10,000 p.s.i. or more either with or without the use of a binder additive. Chemical considerations require a maximum of obtainable proximity of the reactants as diffusion rates in solid state reactions are generally slow and diffusion distances are very short. However, compound formation precedes crystal growth and this sequence makes it possible to control the ultimate crystal size of the new compound by control of temperature.

This control of temperature is difficult in a loose powder due to poor thermal conductivity, but is greatly facilitated in a highly compacted mass, such as in pressed rods of about 1 inch diameter or other similar shapes. In this invention the ultimate crystal size is kept small by keeping the reaction temperature low, while promotion of thermal reaction and diffusion is accomplished by particle proximity. In conventional methods the requirement for proximity is being neglected. This is due to the general belief that the products of reaction become too hard for easy grinding if the starting materials do not remain "fluffy" with much entrained air separating the particles. Experiments have shown that a separation of particles in this manner seriously impedes thermochemical diffusion and compound formation, that relatively high temperatures have to be used to overcome the gaps between the particles and cause them to react. Under such conditions the danger of an inhomogeneous product is considerably increased. This was not found to be true if the thermochemical process is carried out in accordance with this invention. Ball mill grinding speeds have increased five fold in some typical cases, from 20 to 4 hours with particle size reduction to less than 1 micron.

The raw materials for the manufacture of polyoxide electronic materials are usually high purity metal oxides, sometimes fluorides, or chemicals that can be readily converted into oxides by calcination, such as hydroxides, carbonates, oxalates, etc. These are usually produced by chemical precipitation from aqueous solutions and some control of particle size is generally feasible through control of the precipitation process. For example, the precipitated particles can be single crystals often 0.05 to 1 micron in diameter or can be agglomerates of such single crystals varying in size from 1 to 10 micron. During calcination the loss in weight is a measure of the porosity of the oxide grain which can reach 30% and more in some cases. The metastable structure of the calcined grain becomes reoriented into the crystallographic oxide structure as the temperature is increased; however, the calcining temperature used in the chemical industry is usually just sufficient to achieve conversion to oxide and its effect on grain shrinkage and crystal growth is only minor. Although the grain may have a size of 1–10 microns, the ultimate crystals of oxide which form during calcination within the grain may be as small as 0.1 micron. This invention takes advantage of this small crystal size in the thermochemical compound formation during step (1); however, in conventional presintering where temperatures are higher, the porosity is often frozen when the grain harden and is not eliminated by grinding and final kiln firing. Porosity from this source has been observed as a defect in the final piece.

Conventionally densification of porous grain raw materials is accomplished by heating to high temperature which may be as high as 1400° C. and more in cases of refractory oxides. At such high temperatures appreciable recrystallization and grain growth takes place, which defeats the small crystal size approach to production of polyoxide materials. In accordance with the present invention the grain porosity is appreciably reduced by collapsing the grain structure through compression, deformation, shear and fracture at high pressures without exposure to high temperatures. Compression before thermal reaction, therefore, serves a twofold purpose: (1) to achieve a maximum of proximity of the constituents in a polyoxide mixture, and (2) to achieve densification and fracture of porous grain and some measure of additional mixing that is inherent in fracture.

Improvements in materials preparation in accordance with this invention have made possible some notable improvements in properties and in the reproducibility of electronic polyoxide materials.

This invention is believed to be an improvement over both the Snoek (2,452,530) and Downs (3,093,589) patents. In producing the magnetic cores of Snoek, sintering and grinding is repeated several times at low temperatures, but, without compression. In the present invention, the oxides are compressed and heated for a sufficient length of time to that temperature producing a new compound having a crystal size of 1 to 2 microns. By sintering to this crystal size, the crystals are still in a state of relatively loose aggregation or in a state of soft sinter. Thus, the aggregated mass may be readily broken up to the ultimate crystal size in short ball milling cycles or in a jet mill.

In Downs, the necessary thermochemical reaction is promoted with the use of a chloride catalyst which greatly inhibits the crystal growth.

Accordingly, it is an object of this invention to improve the processing methods for polycrystalline electronic materials to achieve greater exactness in final properties.

Another object of the invention is to form non-metallic compounds by thermochemical reaction under conditions of minimum temperature to prevent appreciable crystal growth and hard aggregates.

Still another object of the invention is to achieve the previous objectives by simple low cost means to prevent increases in processing cost.

Yet additional objects of invention will become apparent from the ensuing specification and attached drawing wherein:

FIGURE 1 is a schematic diagram illustrating the method steps of producing the polyoxide compounds, and FIGURE 2 is a graph illustrating the importance of particle size control.

Figure 3B:
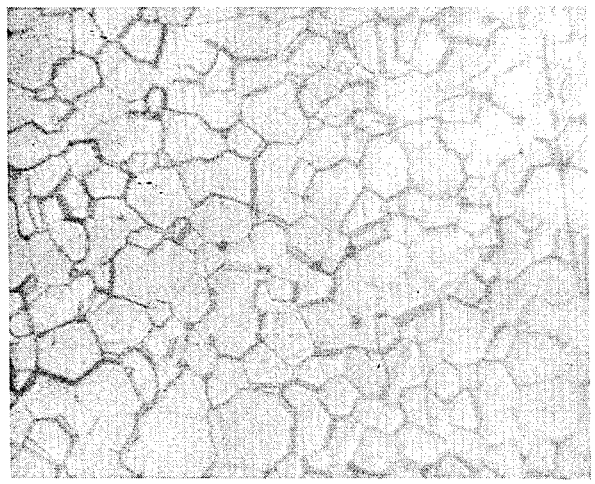

FIGURE 3 constitutes microphotographs of:
(a) conventionally fired garnet ($800\times$, $\frac{3}{8}''=10\mu$) and
(b) of a garnet synthesized according to the present method ($800\times$, $\frac{3}{8}''=10\mu$).

The importance of particle size control can be demonstrated graphically as shown in FIGURE 1. When 1 cubic centimeter is divided into cubes of ½, 1, 2, 3, 5, 10 microns in length, the number of individual cubes vary from 8000 billion to 1 billion. The sharp rise in the number of particles begins at 5 microns with 8 billion particles which increase to 1000 to 8000 billion at 1 and ½ micron, respectively. The practical experience in sintering to dense shapes has been that starting powders to average particle size of ½ to 1 micron are thermally very active, recrystallize to dense shapes readily and at relatively moderate temperature and are dense when reaching a crystal size of about 5 microns. Powders with an average particle size of .2 to 3 microns are only moderately active and become dense at a crystal size of about 9 to 10 microns, while powders of 5 microns are relatively inactive and even when fired at relatively very high temperatures, but do not necessarily become dense even when crystal growth has progressed to 30 microns.

The decrease in reactivity with increase in particle size, and the need for increased sintering temperature shows the importance of particle size, contact area and proximity between particles, diffusion rates and distances. When this is equated with the sensitivity of some oxides to high temperature decomposition, it becomes apparent that any gain towards lower processing temperatures becomes very important.

Polyoxide materials, such as ferrites or titanates, reach density at kiln temperatures close to partial decomposition through loss of oxygen. This can be prevented essentially through a chemically homogeneous starting material of high thermal reactivity and a particle size of ½ to 1 micron. In order to demonstrate these concepts more fully, the thermochemical phase in the materials preparation of step (1) is divided into the successive steps of compound formation and incipient or soft sintering, as shown in FIGURE 1. Hard sintering takes place in step (3). The limits between them are, of necessity, arbitrary and dictated by practical processing considerations, as hereinbefore explained.

Thermochemical compound formation and incipient or soft sintering for materials preparation in step (1) are in this invention the two phases of interest, while hard sintering is to be avoided and is reserved to the production of the finished dense shape by kiln firing in step (3). In a soft sinter the compound has formed and a process of crystalline re-orientation has begun, but the growth of individual crystals is limited purposely to the order of about 1 micron. In this stage agglomeration into aggregates has begun, but these aggregates are still relatively soft and subject to ready disintegration by grinding.

There are other instances which illustrate the importance of material preparation. Hot pressing of polyoxide materials is usually carried out at temperatures 100 to 200° C. below the temperature of conventional, atmospheric pressure kiln firing. Crystal growth and thermal diffusion is minor under the temperature conditions in the hot press and especially when the time at temperature is very short. A well reacted, chemically homogenous powder of an average particle size of 1 micron or less is mandatory if a dense reproducible product of about 1 micron crystal size has to be produced.

Another illustration is the effect of particle size in a polyoxide compound on the dielectric loss tangent. This is a rather sensitive test on chemical homogeneity in a dielectric material or ferrite as it shows the presence and effect, even of minor quantities of electrically conductive material existing within the crystal or in the grain boundries, such as decomposition products of $TiO_2$ or $Fe_2O_3$. These decomposition products originate from uncombined oxide and cause fluctuations in the dielectric properties and the saturation magnetization of microwave ferrites and garnets and reflect on the quality of materials preparation.

Still another example will show the defect mechanism which originates in inhomogeneities caused by large particles or segregation of the ingredients. In some multioxide system two or more compounds can form, such as in a nickel-cobalt ferrite with some aluminum substitution for part of the iron. If particle size control and homogeneity are poor it is possible that besides nickel ferrite, also cobalt ferrite and nickel aluminate will form during materials preparation. These compounds are of the same crystallographic form and can grow inhomogeneously by absorbing more of their own kind or other spinal material in the mixture. After growing to several microns in size they tend to lose the ability to form a chemically homogeneous single phase. Although crystallographically homogeneous, the final product will be composed of crystals that vary in chemical composition, and, consequently, in electronic properties with the result that the final product will be electronically variable and difficult to reproduce.

Similar defects have occasionally been observed when coarse grained yttrium iron garnet was used in the production of yttrium from garnet. As the phase diagram indicates, an inhomogeneous distribution of iron oxide, or coarse yttrium oxide, may cause a local excess of iron oxide and will promote the formation of yttrium orthoferrite and if this remains unreacted with the residual yttrium oxide in the mixture, the ortho-ferrite can grow to a crystal size where its reactivity has sufficiently diminished so that it appears as a second phase in the final product.

When submicron oxide materials are not available, it is desirable to use water soluble salts of such oxides as the starting material. These salts, such as nitrates, chlorides, etc., are weighed out in chemically equivalent weights to the oxides, dissolved in water and precipitated usually with ammonia, ammonium carbonate or oxalate as carbonates, hydroxides, oxolates. The water is removed by settling and filtration followed by mild calcination to remove water of hydration and ammonium compounds. The dried material consists essentially of lumps of intimately mixed oxides of very small particle size, less than about 0.05 micron, but containing large amounts of pore space. The lumps are broken up and then processed in accordance with this invention by compression into rods to collapse the pore space and to obtain close contact of the oxide particles, then heat treating the rods by soft sintering at a suitable temperature to form the desired polyoxide compound, but limiting crystal growth of the compound to approximately 1 micron. The rods are then broken up to about ⅛ inch particles, which are further crushed to an average range of 1 to 2 micron. This powder is formed into the final shapes and hard sintered by kiln firing as has been described before.

The defect conditions in these examples are prevented in accordance with this invention by preventing excessive crystal growth through high temperature during compound formation. Fine grain raw materials, mixing to homogeneity and thermal reaction after compression at low temperature before appreciable crystal growth and local hard sintering can take place, will minimize or eliminate the compositional defects of these examples.

From the foregoing description it will be seen that the invention resides in a method of producing polyoxide thermochemical compounds by blending submicron raw materials to form a homogeneous mixture, then increasing the proximity and the actual contact areas of the particles by compression in an isostatic press, simultaneously deforming and fracturing the constituent grains and reducing their pore volume, then heating the pressed blanks to cause reaction and compound formation, but keeping the resulting crystal growth to an average of about 1 micron or less through control of temperature to the lowest possible level for a given composition. Each composition has its own optimum temperature level which must be determined experimentally.

With these background explanations in mind, the invention is carried out in the following manner as schematically illustrated in FIGURE 1.

Material preparation—Step 1

The constituent oxides are selected from chemical suppliers in accordance with desired purity and particle size. The ultimate crystal size should be of the order of 0.1 to 0.5 microns. If severely agglomerated so that disintegration of the agglomerates does not take place in a blender, the material should be micronized in a jet mill or by other suitable method. The various oxide ingredients are weighed out accurately in accordance with a proven formula or molecular proportions for a given compound. The powders are poured into a suitable quantity of water or other liquid to give a creamy, viscous consistency and the liquid is agitated vigorously in a high speed blender or ball mill. After removal of the liquid and drying, the mixture of oxides is subjected to heat treatment during which compound formation and soft sintering takes place.

EXAMPLE I

Yttrium-Iron Garnet $3Y_2O_3.5Fe_2O_3$

The material is processed as previously described and the following table shows a comparison of the method of this invention with conventional presintering. The final kiln firing temperature in all cases was 1440° C.

| Conventional | 1 | 2 | 3 | 4 | 5 | Standard | New method |
|---|---|---|---|---|---|---|---|
| Saturation magnetization oe | 1,671 | 1,799 | 1,711 | 1,720 | 1,760 | 1,780 | 1,779 |
| Resonance linewidth | 86 | 60 | 139 | 32 | 39 | 35 | 34 |
| Dielectric loss tangent | 0.00025 | 0.00035 | 0.0005 | 0.00075 | 0.00075 | 0.00025 | 0.00025 |
| Dielectric constant | 14.7 | 15.7 | 14.8 | 15.1 | 15.8 | 15.8 | 15.7 |

Isostatic pressing and thermal reaction in Step 1

Control over thermal reaction is achieved, in accordance with this invention, by compressing the dried powder preferably in an isostatic press, into rods about 1 inch in diameter and 9 to 10 inches in length or other suitable and convenient dimension. Usually the natural cohesion of the oxide particles is used without the addition of an organic binder. The temperature level varies with each composition, but is governed primarily by completeness of the thermal reaction within the range of soft sintering, as previously outlined. After heat treatment the rods are crushed in rolls or other equipment to about 0.1 inch average particle size which becomes suitable as feed for a ball mill or jet mill where it is reduced to 1 micron or less.

Forming of final shapes in Step 2

The resulting powder from Step 1 is used in forming of final shapes by dry pressing, wet pressing, isostatic pressing or extrusion.

Kiln firing in Step 3

The last step is a high temperature kiln firing under hard sinter conditions to develop a dense shape of desired characteristics.

The scope of the invention may be illustrated by examples of thermochemical compounds of oxides which can be produced in accordance with the method herein described:

EXAMPLES

Ferrite—Spinel type.—$(M^2)O.Fe_2O_3$ (divalent M)

Simple and complex ferrite as crystalline solutions with substitutions of MO, such as (Mg, Li, Mn, $Fe_2$, Ni, Co, Zn, Cd, etc.) and in part substitutions of $Fe_2O_3$ by $Al_2O_3$, $Cr_2O_3$, $Ga_2O_3$, $In_2O_3$, etc.

Ferrite—Garnet type.—$3(M^3)_2O_35Fe_2O_3$ (trivalent Me)

Where $(M^3)_2O_3$, sometimes hereinafter referred to as X, is represented by $Y_2O_3$, $YF_3$, $Gd_2O_3$ and various other rare earth oxides and fluorides, $Fe_2O_3$ may be substituted in part by $Al_2O_3$, $Ga_2O_3$, $Cr_2O_3$, etc.

Ferrite—Hexagonal (magneto plumbite) type.—
$BaO.Fe_2O_3$ or Barium fluor ferrite Barium may be substituted by numerous other divalent metaloxides, such as NiO, CoO, MgO, ZnO, and form crystalline solutions of the respective ferrites.

Titanates and mixed titanates of magnesium, lithium, calcium, strontium, barium, zinc, lead, bismuth, etc.

Zirconates, stannates, niobates, vanadates by themselves or as crystalline solutions also with titanates. Zirconyl pyrophosphate, gallates, germanates, etc.

Silicates, such as Fosterite ($2MgO.SiO_2$) Clinoenstatite ($MgO.SiO_2$), Cordierite ($2MgO.2Al_2O_3.5SiO_2$), Pyrope ($3MgO.Al_2O_3.3SiO_2$).

Fluor phogopite mica, Fluor amphibole, etc.

Aluminates such as spinel $MgO.Al_2O_3$.

To those skilled in the art, additional examples will be apparent.

It is important that not only one or two, but all 4 intrinsic parameters are close to the standard. In conventional tests 1 to 5 this is not the case; however, the new method gave properties very close to the standard. In addition, the density was 5.13 which is 99.3% of theoretical density of 5.17, and a very satisfactory result. The thermochemical reaction was carried out at 1190° C. which is 140° C. lower than the conventional presintering temperature; soak time is 6 hours. Ballmilling took 4 hours against 20 hours for the conventional method to reach a minus 1 micron particle size.

EXAMPLE II

Fosterite, $2MgO.SiO_2$

Two mols of high purity magnesium oxide (0.1 micron) and one mol of high purity ground quartz (about 1 micron) are blended for 15 to 30 minutes in a high speed blender with sufficient water to give a creamy consistency. The water is then removed and the powder formed into approximately 1 inch diameter 8 inch long rods in an isostatic press at a pressure of 10,000 p.s.i. or higher.

These rods are then heated to 1100° C. for 6 hours, then crushed and ballmilled in a high alumina ballmill with high alumina balls to a particle size of less than 1 micron. The dried powder is isostatically formed and fired to 1450° C. with a soaking time of 15 hours.

EXAMPLE III

Nickel ferrite, $NiO.Fe_2O_3$

The ingredients of chemically pure grade are weighed accurately, 1 mol weight of each, green nickel oxide and red iron oxide; they are mixed with a quantity of water to give a viscous slip in a high speed blender or a ballmill charged with stainless steel balls. The agitation in the former is usually completed in 15 to 30 minutes, in the latter in 3 to 6 hours. The water is then removed by filtering, oven or spray drying, and the powder is pressed at 6,000 to 20,000 p.s.i. into rods about 1 inch in diameter and 8 inches long.

These rods are stacked in a suitable kiln and heated to 1000° C. with a time at temperature or soak of 6 to 10 hours. The product, which has become dark in color, is broken up into small particles suitable as ballmill feed and milled for 6 hours. The resulting particle size is then about 1 micron with a considerable proportion below 1 micron. The water is then removed and the powder is formed in an isostatic press or by other means and the pressed shapes are hot pressed or are kiln fired at 1190° C. for 12 hours, which is about 60° C. below standard firing temperature for this material. This lower firing temperature is very important for this nickel ferrite, as the dielectric loss tangent increases rapidly by firing above 1200° C.

Manifestly, the condition of synthesis including variations in temperature and pressure may be employed without departing from the spirit and scope of invention, as defined in the subjoined claims.

I claim:

1. In a method for producing polyoxide compound shaped articles wherein the polyoxide compound comprises at least one compound selected from the group consisting of compounds of the formula
  (1) $(M^2)O \cdot Fe_2O_3$ and of the formula
  (2) $3X \cdot Fe_2O_3$ and
  (3) $BaO \cdot Fe_2O_3$ and barium fluor ferrite, wherein $M^2$ is selected from the group consisting of Mg, Li, Mn, Fe$_2$, Ni, Co, Zn and Cd, and X represents rare earth oxides and fluorides, and wherein the $Fe_2O_3$ may be substituted in part by $Al_2O_3$, $Ga_2O_3$, $Cr_2O_3$ and $In_2O_3$, and wherein BaO may be substituted by NiO, CoO, MgO and ZnO
  (4) and magnesium, lithium, calcium, strontium, barium, zinc, lead and bismuth titanates and mixtures thereof said method comprising blending raw material particles to form a homogeneous mixture, compressing the particles of said homogeneous mixture into a first shaped article, wherein the compression of the said mixture collapses the pore space within said mixture and allows close contact of the said particles, soft sintering the said first shaped article by heating at a temperature which will cause single phase polyoxide compound formation, grinding the soft sintered first shaped article to form a powder thereof, forming the ground powders into a second shaped article and hard sintering said second shaped article at a temperature which induces crystal growth, the improvement comprising using raw material particles of an average particle size of no greater than 1 micron, limiting the average crystalline growth size of the polyoxide compounds in the said soft sintering step to no greater than 2 microns by using a soft sintering step temperature which produces an average crystalline growth size of the polyoxide compound of no greater than 2 microns, and thereafter reducing the soft sintered first shaped article to a powder of an average particle size of no greater than 2 microns in said grinding step, whereby the dielectric loss tangent of the resultant hard-sintered second shaped article is no greater than 0.00025.

2. The method as claimed in claim 1, wherein the compression of the particles of the homogeneous mixture into a first shaped article is an isostatic compression.

3. The process as claimed in claim 2, wherein said isostatic compression is at a pressure which is such that the use of a binder in said raw material particles is eliminated.

4. The method as claimed in claim 1, wherein the blending of the raw material particles includes the additional step of pouring said raw material particles into a liquid to obtain a viscous constituency, agitating said viscous constituency, removing said liquid and drying said particles.

5. The process as claimed in claim 1, wherein the soft-sintering step is conducted at a temperature which substantially completes compound synthesis but inhibits crystal growth to a particle size of no greater than 1 micron, by sintering at the lowest possible temperature.

6. The process as claimed in claim 1, wherein the step of grinding the soft-sintered first shaped article to form a powder includes the additional steps of fracturing said soft-sintered first shaped article to form particles of about 0.1 inch in size, and crushing the said about 0.1 inch particles to form smaller particles of no greater than 1 micron in size.

7. A method as claimed in claim 1, wherein said raw material particles are micronized to particles having a crystal size of 0.1 to 0.5 microns.

8. The process as claimed in claim 7, wherein the step of grinding the soft-sintered first shaped article to form a powder includes the additional steps of fracturing said soft-sintered first shaped article to form particles of about 0.1 inch in size, and crushing said about 0.1 inch particles to form smaller particles of no greater than 1 micron in size.

9. The process as claimed in claim 1, wherein said compression of particles of the homogeneous mixture into a first shaped article is accomplished at a pressure sufficient to increase proximity of and contact area between the raw material particles and cause crushing and fracturing thereof.

References Cited
UNITED STATES PATENTS

| | | | |
|---|---|---|---|
| 2,812,234 | 11/1957 | Robinson | 23—51 |
| 2,943,913 | 7/1960 | Brixner | 23—51 X |
| 3,174,822 | 3/1965 | Borchardt | 23—50 |
| 3,193,502 | 7/1965 | Schieber | 23—50 X |
| 3,222,283 | 12/1965 | Illyn et al. | |
| 3,309,168 | 3/1967 | Bayer | 23—50 |
| 3,309,169 | 3/1967 | Bayer | 23—50 |

HERBERT T. CARTER, Primary Examiner

U.S. Cl. X.R.

23—21, 51, 52, 110; 106—39; 252—62.57, 62.58, 62.61, 62.62, 62.63; 264—66